United States Patent [19]
Penczynski

[11] 3,904,809
[45] Sept. 9, 1975

[54] TUBULAR ELECTRICAL CONDUCTOR MADE UP OF INDIVIDUAL SUPERCONDUCTING CONDUCTORS

[75] Inventor: Peter Penczynski, Erlangen, Germany

[73] Assignee: Siemens Aktiengesellschaft, Munich, Germany

[22] Filed: Feb. 21, 1974

[21] Appl. No.: 444,501

[30] Foreign Application Priority Data
Mar. 1, 1973 Germany............................ 2310327

[52] U.S. Cl............ 174/27; 174/DIG. 6; 174/15 C; 174/114 R; 174/130
[51] Int. Cl.².......................................... H01L 39/02
[58] Field of Search.. 174/114 R, 15 R, 130, 113 A, 174/DIG. 6, 15 C, 27; 29/599

[56] References Cited
UNITED STATES PATENTS
3,031,736   5/1962   Madden ........................ 174/114 R
3,370,347   2/1968   Garwin ................................ 29/599
3,662,093   5/1972   Wilson ............................ 174/114 R
3,829,964   8/1974   Critchlow ..................... 174/DIG. 6

*Primary Examiner*—E. A. Goldberg
*Attorney, Agent, or Firm*—Kenyon & Kenyon Reilly Carr & Chapin

[57] ABSTRACT

An electrical conductor which is particularly useful in the transmission of three-phase current, and which comprises an inner conductor made up of a plurality of individual superconducting conductors arranged in a layer and an outer conductor also made up of a plurality of individual superconducting conductors, surrounding the inner conductor concentrically and spaced therefrom, each individual superconductor consisting of a normally conducting carrier coated with a layer of superconducting material in which each carrier is subdivided in the longitudinal direction into at least two parts which are electrically insulating from each other to increase the short circuit current capacity of the conductor.

2 Claims, 2 Drawing Figures

TUBULAR ELECTRICAL CONDUCTOR MADE UP OF INDIVIDUAL SUPERCONDUCTING CONDUCTORS

BACKGROUND OF THE INVENTION

This invention relates to electrical conductors in general, and more particularly to a tubular conductor made up of superconducting individual conductors for use in the transmission of three-phase current.

Recent technological development in regard to superconductive materials along with advances in low temperature technology have made the transmission of very high power through superconducting cables possible. With the availability of such techniques, it must further be determined whether transmission should be three-phase alternating current or direct current. Transmission of direct current through superconducting cables, has the advantage that no a-c losses occur but has as a significant disadvantage, the fact that rectifier systems capable of handling very high power levels are required to be developed and used. Because of this, d-c cables normally have been considered primarily for the transmission of the highest power e.g., up to 200 GW, where what are normally referred to as hard superconductors such as niobium-titanium and niobium-tin combinations are applied. Because of their higher operating costs per kilometer, as compared to d-c cables, superconducting three phase cables would appear to be suitable primarily for the transmission of energy over short distances up to 100 km, for example, depending on the power and voltage to be transmitted. In particular, their use would appear advantageous for feeding medium to large amounts of power (1 to 10 GW) from existing high voltage a-c systems to concentrated areas of high energy consumption such as cities.

Because of the a-c losses, what are normally referred to as soft superconductors such as niobium and, to a lesser extent, lead, are normally used in three-phase conductors. The a-c losses in niobium will remain low, as long as the magnetic field strength occuring at the surface of the conductor remains below the critical field strength $H_{ct}$ which is about $1.1 \times 10^5$ A/$m$ at 4.2 K. Current in such superconducting conductors, flows only in a surface layer which is a fraction of a micrometer thick, so that very small layer thicknesses of the superconductor can be used. The typical conductor shapes contemplated for this use have been cylindrical and hollow cylindrical designs, to avoid non-uniform current distribution.

It is advantageous if superconducting layers are applied to tubes of normally conducting material such as copper or aluminum. The normal conducting tubes will then act to stabilize the superconductor. That is, they are able to take over the short current circuit in the event of an overload if a transition of the superconductors from the superconducting to the normal state, which is referred to as "quenching" occurs. It is not possible to design the superconductors themselves, in such a manner that they can withstand the overload current without quenching because of the fact that, among other reasons, this would require a larger outside diameter and an extremely high cost.

A number of previous a-c cable designs have been proposed. One such three-phase cable is disclosed in "Elektrotechnische Zeitschrift, Edition B," Vol. 20 (1968), p. 273 to 277, which provides a separate conductor for each phase. Each of the phase conductors is designed using an inner tubular superconducting forward phase conductor, and surrounding this inner conductor, a tubular superconducting return phase conductor with the two conductors arranged concentrically with a predetermined spacing of sufficient magnitude for the voltage being carried, through the use of specially designed spacer elements. As taught therein, the tubular superconducting phase conductors can be stabilized through the use of the normally conducting material. In this arrangement, the three return conductors of the three-phases are coupled together at the cable input so that complete field compensation outside the conductor system is achieved. The conductors are free of forces, the current and field distribution at the conductor surfaces is homogeneous and the a-c losses of the superconductor due to geometry are small. Proper spacing between the inner and outer conductors allows a specified high voltage breakdown strength to be achieved. Since, in such a coaxial arrangement of individual pairs of conductors, electric and magnetic fields exist only between the outer and inner conductors, normal conductors can be arranged in any required quantity within the inner conductor and outside the outer conductor without eddy current losses being produced therein. Thus, it is possible to stabilize these superconductors in such a manner that after transition of the superconductors into the normally conducting state, a well cooled normally conducting stabilization material is available, which can temporarily take over a short circuit current without appreciable rise in temperature. In this arrangement, however, the electrically stabilizing effectiveness of the normally conducting material is limited. This limitation comes about due to the skin effect which occurs in a tubular configuration. Furthermore, the cable must be length compensated when cooling down through the use of corrogated members. The major disadvantage of this rigid cable arrangement is in its need for difficult installation procedures in the field.

The replacement of hollow coaxial cylindrical tubes such as those described above, by individual wires arranged side-by-side in the longitudinal direction of the conductor results in a flexible conductor. An embodiment of this nature for a low temperature cable is disclosed in an article by Wilkinson published in the Proceedings of the IEE, Vol. 113, No. 9, Sept. 1966, p. 1509 to 1521. In the cable disclosed therein, the spacing of the individual aluminum or beryllium wires is chosen to be in what is called a transposed arrangement within the two coaxial layers such that each of the wires takes over a uniform amount of the current.

Another arrangement is disclosed in German Auslegeschrift No. 1,814,036 in which several individual conductors are arranged about the axis of the cable in several layers. Each layer of the individual conductors is twisted with respect to the cable axis such that the conductors form a helix. The pitch of the helix is selected so that the length of the cable will remain constant, regardless of temperature variations. The individual conductors are stabilized by normal conducting materials, such as copper or aluminum, so that in the event of a disturbance such as a short circuit, they can take over the entire current for a short period of time without appreciable temperature rise. In order to avoid eddy current losses in the stabilizing material, the individual conductors generally comprise a normally conducting wire which has a superconducting material applied to its surface.

It has been discovered that arranging the individual conductors side-by-side in the same layer can lead to an asymmetrical current distribution in the normal conducting carrier material of the individual conductors. Because of this asymmetry, only a portion of the cross section of the normally conducting carrier material is utilized for stabilization. Thus, there is a need to increase the stabilizing effect of the normal conducting cross section of the individual conductors.

SUMMARY OF THE INVENTION

The arrangement of the present invention provides improved utilization of the carrier material for stabilization. To accomplish this, each normal conducting carrier in an individual conductor is subdivided along its length into at least two parts which are insulated from each other and which are twisted in their longitudinal direction.

As a result, the Joule losses per unit surface area of the normally conducting stabilization material are reduced. The smaller these Joule losses are, the larger is the permissible overcurrent. By subdividing the normal conducting carriers and in conjunction therewith by twisting them, a better utilization of the stabilization material is obtained due to the symmetrical current distribution achieved through these measures. Compared with the corresponding conductor arrangement of individual conductors without subdivision of the stabilization material, the Joule losses per unit surface area can be reduced by about a factor of 2. This results in increasing the short circuit current carrying capacity by a factor of approximately $\sqrt{2}$.

In the preferred embodiment disclosed, the individual conductors comprise aluminum wires having a coating of niobium. The use of aluminum further increases the short circuit current carrying capacity of the phase conductor. With an increasing number of individual conductors Joule losses increase for a given conductor diameter, since with a given radius and with increasing numbers of individual conductors, the cross section of the individual conductors will be smaller and thus, the geometrical dimensions of the cross section areas can become even smaller than the depth of penetration into the conductor material (skin effect). The increase of Joule losses as a result of these effects is smaller for aluminum than for example, for copper since the depth of penetration for aluminum is less due to the better residual resistance ratio of aluminum. As a consequence, the depth of penetration will exceed the wire diameter only where a large number of individual conductors are used.

DETAILED DESCRIPTION OF THE PREFERRED EMBODIMENT

Figure 1:
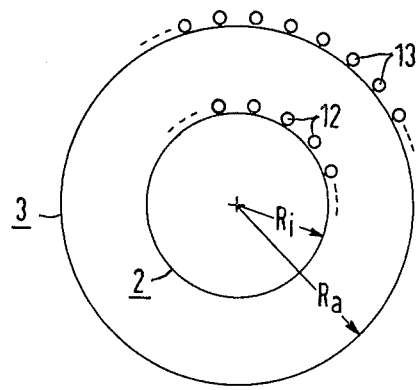
FIG. 1 is a schematic cross sectional view of a coaxial conductor made up of a plurality of individual conductors for one phase of a three phase system.

As shown, the figure illustrates a one-phase conductor of a three-phase cable. As shown, the phase conductor is essentially made up of individual superconducting conductors 12 and 13 of which only a few are shown in detail on the figure. The individual conductors 12 are arranged on a circle within an outside inner conductor radius designated $R_i$. Typically, the conductors within the circle defined by the radius $R_i$ will be used as the forward conductors for one phase of a three-phase system. At a predetermined spacing which is established in order to provide proper insulation and ensure the high voltage strength of the phase, a further layer made up of individual conductors arranged concentrically at a radius Ra about the individual conductors 12 is provided. Typically, the individual conductors 13 will serve as the return conductor of this phase of the three-phase system. The individual conductors 12 and 13 are of circular cross section and preferably will be transposed, i.e., they are arranged in individual layers in such a manner that they always take over the same amount of operating current. In addition, the individual conductors can be arranged so that the overall conductor retains its constant length regardless of temperature variation. This type of construction is described in detail in German Auslegeschrift No. 1,814,036, for example.

The individual conductors 12 of the outgoing phase conductor can be arranged on the outer cylinder of a hollow, cylindrical, helical body of plastic, not shown in detail in the figure. Around the layer designiated 2 of these individual conductors an electrical insulating layer of plastic foil may be placed. On the outside of the layer of plastic foil insulation, also not shown on the figure, the layer 3 of individual conductors 13 can then be arranged. The insulating layer which serves also as a mechanical spacer between the two conductor layers 2 and 3 furthermore determines the dielectric high voltage strength of the phase conductor. As a final step, the fixed position of the individual conductors 13 can be secured by an armor in conventional fashion. Preferably, the helical plastic member along with the armor will be designed so that they allow free access of a cooling medium to the individual conductors. As an example, the plastic member can be designed so that it forms a helix about the axis of the phase conductor in the form of a ribbon shaped plastic spiral, having a pitch larger than the width of the helical ribbon, to allow cooling medium to flow therein.

Figure 2:
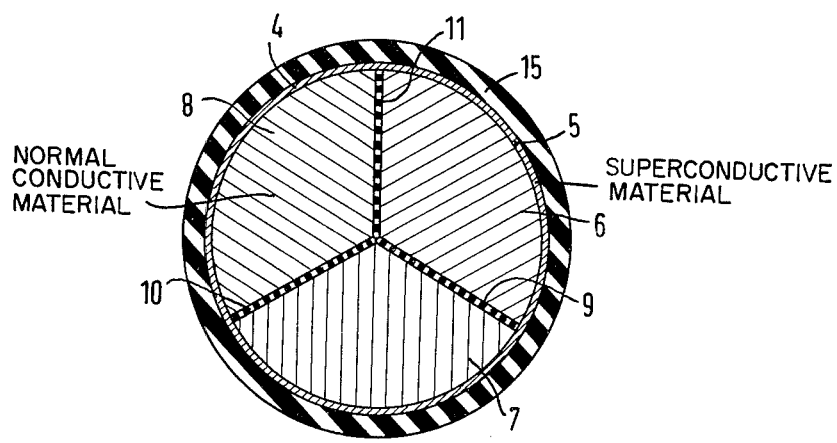
FIG. 2 is a cross section through an individual conductor illustrating the manner in which it is divided and insulated.

FIG. 2 illustrates the design of the individual conductors 12 and 13 in detail. As illustrated, the carrier 4 of the individual conductor which is a normally conducting wire having, for example, a circular cross section and which will consist of copper or, more preferably of aluminum is used for stabilization as described above. The material being stabilized is the superconducting material 5 which is arranged in the form of a thin layer with good electrical contact around the normal conductor 4. According to the present invention, the cross section of the normal conductor 4 is subdivided into at least two segments, with the one shown on FIG. 2 being divided into three segments designated 6, 7 and 8 respectively, all of approximately equal size. The segments are electrically separated from each other by insulating segments designated 9, 10 and 11. In addition, each individual conductor made of the segments and covered with a superconducting material such as niobium, is covered with an outer insulating layer 15 to prevent electrical contact of the superconducting surfaces if individual conductors are placed close together. The sheath-like insulating layers 15 also serve as spacer elements between adjacent individual conductors. They can be made so that they ensure a fixed position of the individual conductors, when arranged in a single layer. If such is done, additional support of the inner layer of the phase conductor by separate member is not necessary.

The cross section of the individual conductors 12 and 13 need not necessarily be circular. They may also be circular conductors which have been flattened somewhat through a pressing operation, so that they assume a slightly rectangular shape with rounded edges. Such deformation is limited, however, to the geometrical dimensions in which the cross sections do not reach the order of magnitude of the depth of penetration (skin effect) into the conductor material.

A phase conductor according to the present invention and which contains individual niobium-coated aluminum wires 12 and 13 can be used, for example, for transmitting an operating current of $10^4$ A at an operating voltage of 64 kV. The power transmitted by a three-phase cable with three such phases will be approximately 2000 MVA. A conductor of such capacity can be constructed with the radii of the forward and return conductor of one phase being as follows: $R_I = 3 \times 10^{-2}$ m and $R_A = 5 \times 10^{-2}$ m, respectively. With these dimensions, a peak value of the magnetic field for the forward conductor designated $H_S$ of 94.3 $mT$ is obtained. This value is considerably smaller than the value for the lower critical field strength of niobium designated $H_{cl}$ (N$b$) which is approximately 150 mT. The Joule losses per unit surface area are nearly independent of the number m of individual conductors making up the total cable for a wide range. These losses are approximately constant in the range of $10 < m < 300$. With $m = 100$ aluminum wires with a residual resistance ratio of 1000, a wire diameter of $2 \times 10^{-3}$ m and an operating current of $10^4$ A, in an inner outgoing conductor losses are about $2.5 \times 10^{-3}$ W/cm$^2$. With a disconnect time of 200 msec and a permissible temperature rise of the helium bath for cooling the superconducting material of the conductor of 0.5 K. a value of short circuit current about 22 times larger than the stated operating current can be handled. This is in contrast to a tubular conductor using copper as a stabilizing material and having a wall thickness of 3 mm and a residual-resistance ratio of about 100, which can carry a current only about eight times the stated operating current.

Thus, an improved superconducting cable which can be used for conducting three-phase currents has been shown. Although a specific embodiment has been illustrated and described, it will be obvious to those skilled in the art that various modifications may be made without departing from the spirit of the invention which is intended to be limited soley by the appended claims.

What is claimed is:

1. In a tubular electrical conductor for the conduction of one phase of a three phase cable, said conductor having at least one layer of individual conductors each of which comprise a carrier fabricated of electrically normally conductive metallic material having a layer of electrically superconductive metallic material applied thereto and which are disposed adjacent each other in a side-by-side arrangement, the improvement comprising a carrier structure for each of said individual conductors, said carrier structure being subdivided into at least two parts along the longitudinal axis thereof, and said at least two parts being twisted about said longitudinal axis, and means, disposed between said at least two parts, for electrically insulating said at least two parts from each other.

2. The conductor recited in claim 1, wherein said carrier structure is fabricated of aluminum and has a layer of niobium disposed thereon.

* * * * *